(12) United States Patent
Breuer et al.

(10) Patent No.: US 10,798,727 B2
(45) Date of Patent: Oct. 6, 2020

(54) METHOD FOR UPLINK COMMUNICATION IN A LTE CELLULAR NETWORK

(71) Applicant: GEMALTO M2M GMBH, Munich (DE)

(72) Inventors: Volker Breuer, Boetzow (DE); Lars Wehmeier, Falkensee (DE); Thomas Ulrich, Bad Dürkheim (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 246 days.

(21) Appl. No.: 15/565,559

(22) PCT Filed: Apr. 12, 2016

(86) PCT No.: PCT/EP2016/058037
§ 371 (c)(1),
(2) Date: Oct. 10, 2017

(87) PCT Pub. No.: WO2016/166113
PCT Pub. Date: Oct. 20, 2016

(65) Prior Publication Data
US 2018/0124814 A1    May 3, 2018

(30) Foreign Application Priority Data
Apr. 16, 2015    (EP) .................................... 15163860

(51) Int. Cl.
*H04W 72/12* (2009.01)
*H04L 5/00* (2006.01)
(Continued)

(52) U.S. Cl.
CPC ....... *H04W 72/1268* (2013.01); *H04L 5/0037* (2013.01); *H04L 27/2636* (2013.01);
(Continued)

(58) Field of Classification Search
CPC ........... H04W 72/1268; H04W 72/048; H04W 72/0453; H04W 4/70; H04W 72/042; H04L 27/2636; H04L 5/0037; H04L 27/0008
See application file for complete search history.

(56) References Cited

U.S. PATENT DOCUMENTS

| 6,377,817 | B1 * | 4/2002 | Hakaste | H04L 1/0003 |
| | | | | 455/553.1 |
| 7,443,928 | B2 | 10/2008 | Nefedov et al. | |
| | | (Continued) | | |

FOREIGN PATENT DOCUMENTS

| CN | 1806396 A | 7/2006 |
| JP | 2000-115834 A | 4/2000 |
| | (Continued) | |

OTHER PUBLICATIONS

International Search Report (PCT/ISA/210) dated Jun. 30, 2016, by the European Patent Office as the International Searching Authority for International Application No. PCT/EP2016/058037.
(Continued)

*Primary Examiner* — Ivan O Latorre
(74) *Attorney, Agent, or Firm* — Buchanan Ingersoll & Rooney PC

(57) ABSTRACT

The present invention relates to a method for data transmission from a wireless device to a base node, the base node is part of a cellular network and is configured to support frequency division multiple access method, the bandwidth receivable by the base node comprising a plurality of subcarriers, the wireless device is camping on the base node, the method comprises the steps of: —for the base node, assigning to the wireless device a subcarrier of the plurality of subcarriers, —transmitting data from the wireless device to the base node for the period of at least one data service session using only the assigned subcarrier, whereby using (Continued)

for said data transmission a first modulation scheme on the assigned subcarrier different from the modulation scheme used for more than one of the plurality of the subcarriers by at least one second wireless device camping on said base node.

16 Claims, 4 Drawing Sheets

(51) Int. Cl.
*H04W 4/70* (2018.01)
*H04L 27/26* (2006.01)
*H04W 72/04* (2009.01)
*H04L 27/00* (2006.01)

(52) U.S. Cl.
CPC ............ *H04W 4/70* (2018.02); *H04W 72/042* (2013.01); *H04W 72/048* (2013.01); *H04W 72/0453* (2013.01); *H04L 27/0008* (2013.01)

(56) References Cited

U.S. PATENT DOCUMENTS

| | | | | |
|---|---|---|---|---|
| 9,451,554 | B1* | 9/2016 | Singh | H04W 52/146 |
| 2005/0175122 | A1* | 8/2005 | Nefedov | H04B 1/7105 |
| | | | | 375/323 |
| 2007/0189199 | A1* | 8/2007 | Nishio | H04L 5/023 |
| | | | | 370/328 |
| 2008/0032726 | A1* | 2/2008 | Tajima | H04L 1/0003 |
| | | | | 455/509 |
| 2008/0247375 | A1* | 10/2008 | Muharemovic | H04W 72/0426 |
| | | | | 370/344 |
| 2010/0157786 | A1* | 6/2010 | Akita | H04L 5/023 |
| | | | | 370/210 |
| 2013/0094490 | A1* | 4/2013 | Taromaru | H04L 25/03834 |
| | | | | 370/343 |
| 2014/0376509 | A1* | 12/2014 | Young | H04W 4/70 |
| | | | | 370/330 |
| 2016/0105891 | A1* | 4/2016 | Li | H04W 4/70 |
| | | | | 370/329 |
| 2017/0013581 | A1* | 1/2017 | Dai | H04L 5/1469 |

FOREIGN PATENT DOCUMENTS

| | | | |
|---|---|---|---|
| JP | 2004-537239 | A | 12/2004 |
| JP | 2008-103859 | A | 5/2008 |
| JP | 2011-530837 | A | 12/2011 |
| JP | 2013-090012 | A | 5/2013 |

OTHER PUBLICATIONS

Written Opinion (PCT/ISA/237) dated Jun. 30, 2016, by the European Patent Office as the International Searching Authority for International Application No. PCT/EP2016/058037.

Office Action (Notification of Reasons for Refusal) dated Oct. 23, 2018, by the Japan Patent Office in corresponding Japanese Patent Application No. 2017-548222 and English translation of the Office Action. (11 pages).

General Dynamics Broadband UK, R1-125204, Coverage Extension for MTC UEs, 3GPP TSG RAN WG1 #71, 3GPP Server Publication Date: Nov. 2, 2012. (7 pages).

InterDigital Communications, LLC, R1-120144, GSM/(E)GRPS reference link budgets for MTC services, 3GPP TSG RAN WG1 #68, Dresden, Germany, 6th-10th, 3GPP Server Publication Date: Feb. 1, 2012. (3 pages).

English translation of the Office Action (Notice of Preliminary Rejection) dated May 8, 2019, by the Korean Patent Office in corresponding Korean Patent Application No. 10-2017-7033226. (5 pages).

Office Action dated Mar. 19, 2020, by the State Intellectual Property Office of People's Republic of China, in corresponding Chinese Patent Application No. 201680021769.9 and English translation of the Office Action. (15 pages).

\* cited by examiner

METHOD FOR UPLINK COMMUNICATION IN A LTE CELLULAR NETWORK

FIELD OF THE INVENTION

The present invention relates to a method for data transmission from a wireless device to a base node, in particular for low capability wireless device in a long term evolution network.

The invention also pertains to a wireless device using said method. The invention further relates to a base node communicating with said wireless device.

BACKGROUND OF THE INVENTION

Generally, in the field of wireless communication the technology of long term evolution (LTE) is being standardized by the 3GPP as a technology allowing higher bandwidth with reduced latencies, in particular in order to allowing the introduction of new services with higher data needs than offered by the available cellular networks supporting 2G (GSM, GPRS, EDGE) or 3G (UMTS, HSPA). At the same time there are tendencies of the network operators to reduce the number of maintained cellular network standards. At long sight it is expected that at least one of the legacy cellular networks will be switched off.

On the other hand the definition of the long term evolution standard implies that wireless devices supporting the standard—no matter in what kind of service—need to provide certain capabilities which require wireless devices with a remarkable processing power. In particular the need to support a 20 MHz frequency band in one millisecond requires a significant amount of hardware resources on the side of the wireless device.

This situation is of course incompatible with the growing trend of machine-to-machine (M2M) devices. Those M2M devices are typically those where machines like vending machines, point of sale (POS) devices, electricity meters or other sensor devices, or home security devices regularly communicate via the cellular network with remote servers, and they are preferably designed for rarely sending small amounts of data. Those M2M devices are hence low capability wireless devices. They are usually equipped with a wireless module incorporating all required components for conducting all signaling exercises with the cellular network they are operating in.

From a cost perspective a low capability wireless device like the mentioned examples would merely be attractive if a LTE capable wireless module would be incorporated. At the same time there are by now already millions of low capability wireless devices in the field, and if only they would switch to LTE, the present LTE capable cellular networks (LTE networks) would capacity wise be overwhelmed with this load. This is the case even if the low capability wireless devices as such are only rarely sending data, as a remarkable amount of overhead signaling is required according to today's standard specification without providing any payload.

There is therefore a need for an adaptation of the LTE standard in order to on the hand support low cost devices, in particular low capability wireless devices, and on the other hand to prepare the LTE networks for serving the expected amount of low capability wireless devices.

It is by now known that a reduction of the frequency band to a smaller portion of carriers that need to be supported by the low capability wireless devices, including the uplink communication, would reduce the processing resources on side of the wireless device. By now those approaches did not lead beyond the required amount of 1.4 MHz corresponding to the basic unit of a resource element. Moreover there are approaches missing that ease the processing requirements of a low cost device for uplink communication beyond the mere supported bandwidth.

It is therefore a goal of present invention to propose a solution for an improved communication protocol of LTE capable wireless device in the uplink direction to a corresponding base node, which allows remarkable reductions in the processing resources of the wireless device with low impact on the architecture of the base node.

SUMMARY OF THE INVENTION

Therefore it is according to a first aspect of the invention suggested a method for data transmission from a wireless device to a base node according to claim 1. It is further suggested according to a second aspect of the invention a wireless device according to claim 8. According to a third aspect of the invention it is proposed a base node according to claim 11.

It is therefore proposed according to the first aspect of the invention a method for data transmission from a wireless device to a base node, the base node is part of a cellular network and is configured to support frequency division multiple access method, the bandwidth receivable by the base node comprising a plurality of subcarriers, the wireless device is camping on base node, the method comprises the steps of:
for the base node, assigning to the wireless device a subcarrier of the plurality of subcarriers,
transmitting data from the wireless device to the base node for the period of at least one data service session using only the assigned subcarrier, whereby using for said data transmission a first modulation scheme on the assigned subcarrier different from the modulation scheme used for more than one of the plurality of the subcarriers by at least one second wireless device camping on said base node.

The method is based on a base node of a cellular network, wherein the base node supports frequency division multiple access method. This is in particular true for base nodes supporting the LTE wireless standard, the so-called eNodeBs. In LTE uplink communication is preferably conducted using single carrier frequency division multiple access, which means that a wireless device operating with the base node is providing data in the same frequency range together with other wireless devices, wherein the wireless device are supposed to transmit data on one or more assigned subcarriers of the frequency band, as opposed to LTE downlink where the base node can distribute the transmitted symbols for one receiving wireless device over the full range of subcarriers of the supported frequency band.

A subcarrier represents a 15 kHz section of the frequency band.

As part of the uplink data transmission the base node assigns to the wireless device the respective subcarrier it is expected to use for the subsequent data transmission.

This is preferably happening in conjunction with a request from the wireless device for setting up a data service session. This is in particular a period where the wireless device is supposed to transmit data to the base node and/or to transmit to and receive data from the base node. Such a data service session is in particular a data connection, a onetime transmission period or the time the wireless device is camping on the base node. Other events starting and/or ending a data service session are nonetheless also covered.

In response the wireless device is transmitting data on the assigned subcarrier, that is in the frequency range of 15 kHz by means of a modulation scheme, which is different from modulation schemes used by other wireless devices operating with this base node. The used first modulation scheme is in particular a narrowband modulation scheme, which is characterized in that it uses just one subcarrier, hence a single subcarrier modulation scheme.

It is in particular suggested that the first modulation scheme is a narrow band transmission scheme, out of the group of:

continuous wave (CW), and

Gaussian Minimum Shift Keying (GMSK).

These narrowband transmissions schemes are in particular those used within GSM capable cellular networks.

Hence the wireless device makes use of the signaling structure of SC-FDMA but embeds within the assigned subcarrier a different modulation scheme as the common modulation schemes used in LTE, in particular BSPK, QPSK, 16QAM, 64-QAM, which each is a wideband modulation scheme, in particular a frequency multiplexing transmission scheme covering at least one resource block, consisting of 12 subcarriers.

This leads to the situation that at the wireless device for transmitting data far less resources are needed:

only one subcarrier at a time is addressed, for modulation scheme less processing power is needed, in particular as no fast fourier transformation (FFT) resp. inverse fast fourier transformation (IFFT) needs to be carried out.

Instead, with a simpler modulation scheme the wireless device in its transmissions takes advantage of the SC-FDMA structure, in particular the guard intervals and subcarrier spacing resp. guard bands separating the subcarriers, in order to assure that the transmission is not disturbed by other transmitting wireless devices, but does not need the complexity which is expected for wireless devices supporting full fledged LTE resp. SC-FDMA.

In that sense, the data transmission using the first modulation scheme is embedded in the SC-FDMA structure.

According to a further advantageous embodiment the first wireless device and the second wireless device are assigned to different device domains of the cellular network.

With that embodiment it is made use of the definition of domains within the cellular networks. In particular machine-type-communication (MTC) devices are preferred to be handled as a separate domain than mobile handsets. With the concept of domains—regardless of the specific implementation within the cellular network—the cellular network has means to handle such wireless devices differently. This leads to the possibility that only those wireless devices operating in a first domain, in particular for MTC devices, are operating according to the inventive method and using a different modulation scheme for uplink transmission.

This is in particular advantageous as MTC devices have preferably different needs in terms of data transfer rates than mobile handset. While common fully equipped wireless devices are targeting a maximum of data transmission rate, the MTC devices have typically quite opposite requirements. For a wireless device like an electricity meter the transmission time is secondary. Hence less effective modulation schemes are appropriate for the transmission.

According to another preferred embodiment of the invention it is suggested a method comprising the step for the base node of indicating to the wireless device the capability of supporting the indicated first modulation scheme, and subsequently receiving transmissions from the wireless device using the envisaged first modulation scheme.

With this embodiment the wireless device receives from the base node the indication, if the base node is capable of supporting the first modulation scheme.

The indication is in particular submitted with a broadcast from the base node to a multitude of wireless devices, in particular the ones being assigned to the first domain, preferably the MTC domain. The broadcast is preferably part of the system information blocks (SIBs) submitted as part of the BCCH. For the system information it is in particular foreseen to reserve certain system information to MTC devices only. Hence, the indication that the first modulation scheme is supported is preferably integrated in one of the M-SIBs.

When the wireless device receives this information, in response the next data transmission will be started using the first modulation scheme.

For those wireless devices which are in particular physically only capable of transmitting data by means of the first modulation scheme, in particular because not enough resources for other modulation schemes supported by the base node are available, said indication from the base node is in particular used as a suitability criterion. This in particular means, if the wireless device wants to camp on the base node, and the base node indicates that it is not supporting the first modulation scheme, the wireless device needs to find another base node, if available.

According to another preferred embodiment it is suggested method comprising the step for the base node of indicating subcarriers reserved for the first modulation scheme out of the plurality of subcarriers to the wireless device.

With this embodiment the base node additionally or alternatively indicates to the wireless device which subcarrier is to be used for a data transmission by means of the first modulation scheme.

Preferably the previous indication if the base node is capable of supporting the first modulation scheme is combined with this indication. This means, if the base node indicates to the wireless device, which subcarrier is to be used for data transmission by means of the first modulation scheme, this is additionally the information for the wireless device, that the base node supports the first modulation scheme. If no subcarrier is indicated, the wireless device preferably is looking for another base node.

In a further preferred embodiment it is proposed a method wherein the assigned subcarrier is an edge subcarrier, characterized in that the subcarrier is situated at one end of the frequency band supported by the base node.

In conjunction with the assigned subcarrier it is according to this embodiment advantageous to reserve—if available—the subcarriers for the data transmissions by means of the first modulation scheme at the edges of the frequency range. This reduces interference with other subcarriers.

Alternatively or additionally a narrowband RF-filter is adapted to the single subcarrier which reduces interference with adjacent subcarriers. This also makes guard band radio spectrum available for such data transmissions. According to a further advantageous embodiment it is suggested a method wherein the assigned subcarriers is based on frequencies on the flank of the supported frequency band, and said subcarrier is only usable for wireless devices supporting the first modulation scheme.

This embodiment moreover proposes that subcarriers are used that are beyond the frequency range which is allocated for the dedicated number of subcarriers for a frequency band. Typically the receiver of the base node is able to receive a larger frequency bandwidth than it is used for decoding. In particular in the respective frequency bands a number of subcarriers lower than a power of 2 are available. As for the fast fourier transformation (FFT) input values corresponds to a power of 2, the remaining subcarriers are well equipped for transmitting data in a modulation scheme, which are not allocated for subcarriers. Hence it is suggested to assign those subcarriers in this guard band for the data transmissions according to the first modulation scheme.

According to the second aspect of the invention it is proposed a wireless device configured to camp on a base node, being part of a cellular network and being configured to support frequency division multiple access method, and the base node being configured to receive a bandwidth comprising a plurality of subcarriers,
wherein the wireless device is configured to
receive from the base node a subcarrier from said plurality of subcarriers, and
transmit data to the base node for the period of at least one data service session using only the assigned subcarriers,
wherein the wireless device is configured to use for said data transmission a first modulation scheme on the assigned subcarrier different from the modulation scheme used for more than one of the plurality of the subcarriers by at least one second wireless device camping on said base.

The wireless device in particular comprises at least a processing unit, a memory unit and a wireless transceiver. The wireless device is able to support the first modulation scheme, in particular it is only capable for data transmissions to use this first modulation scheme. In particular the wireless device comprises a wireless transceiver, including a RF-unit, wherein the transceiver is capable to transmit data in a frequency range sufficient to address one subcarrier. This is in particular advantageous as it saves hardware resources for the affected low cost wireless devices.

The second aspect shares the advantages of the first aspect of the invention.

According to the third aspect of the invention it is proposed a base node being part of a cellular network, the base node being configured to support frequency division multiple access method and further configured to receive a bandwidth comprising a plurality of subcarriers from at least one wireless device camping on the base node,
wherein the base node is further configured to:
assign to said wireless device a subcarrier of the plurality of subcarriers
receive data transmission from wireless device for the period of on data service session using only the assigned subcarrier, wherein the said data transmission is received in a first modulation scheme on the assigned subcarrier different from the modulation scheme used for more than one of the plurality of the subcarriers by at least one second wireless device camping on said base node.

Generally this aspect shares the advantages of the first aspect of the invention.

Additionally it is advantageous that existing base node implementations, in particular eNodeBs used in today's LTE implementations are from the physical preconditions already suited for being configured according to the invention. In particular the RF-part requires no changes as the same frequency bands are expected to be received. Hence only a software update would be sufficient to adapt the uplink resource scheduler and preferably the downlink transmission, in particular in a broadcast of system information, indicating the capability of supporting the first modulation scheme.

As it is shown this invention advantageously solves the depicted problem and allows wireless devices with low resources to operate within LTE networks according to their data transmission needs.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows the operating step of wireless device respectively a user equipment (UE) and a base node (BS) being part of a LTE network according to the prior art for an uplink transmission according to single carrier frequency division multiple access. The process is shown as a processing queue through the UE to the BS.

Figure 1:
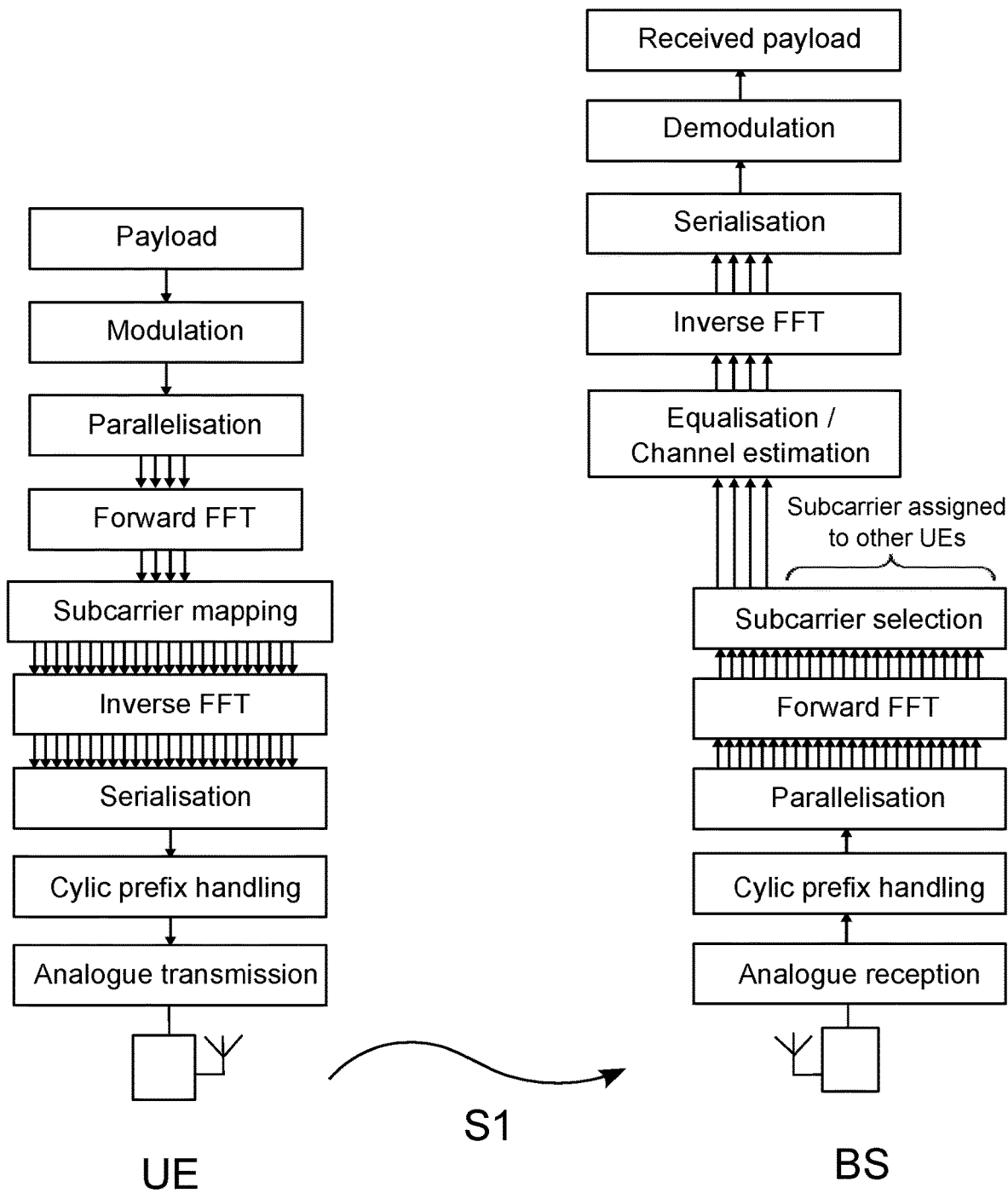
FIG. 1 represents a block diagram of operating steps from transmitting user equipment and receiving base node according to the prior art

In the present example a couple of payload data are put into the process, e.g. as part of a data service session by one UE. The following steps are generally executed by the UE within the protocol stack and in conjunction with the radio frequency unit (RF).

At first the payload data are modulated using the common LTE modulation schemes GPSK, 16-QAM or 64-QAM, depending upon the amount of data and the configured scheme with the BS. Then the modulated data are parallelized that is in one time parts of the modulated data are separated on multiple paths.

These paths in the time-domain are then converted by means of the Forward Fast Fourier Transformation (FFT) in the frequency domain. Based on the data in the frequency domain a mapping on separate subcarriers is possible. As subcarriers each cover 1.4 kHz, one or more subcarriers are depending upon the resources assigned from the base node usable for the data transmission of the specific UE. Typically the mapping is in particular done on resource blocks, which are in fact composed of 12 subcarriers itself.

The mapping to the subcarriers then needs to be transformed for analogue serial transmission on the lower layers. For that first an inverse FFT back in the time domain is carried out, and the result can then be used for serialization.

Specific for LTE is the addition of cyclic prefixes. That means that the serialized transmission on the frequency of the specific subcarrier is enhanced by so-called guard periods, before the analogue transmission over the air interface S1 to the base node is executed.

In the BS the reverse operation needs to be carried out, whereby data from different UEs are expected to be received in the respective frequency range which needs to be sorted out.

First the exact reverse operations to the last operations in the UE are executed: reception of analogue transmitted data over the air interface, then removal of guard periods as part of the cyclic prefix handling, parallelization of data and forward FFT from the time domain in the frequency domain.

In the subcarrier selection step, the data transmission from different UEs, which each got assigned their subcarriers for data transmission, are separated by transmitting UE. For the subcarriers for the shown UE in this example the leftmost four subcarriers are reserved and handled accordingly. Like in OFDMA then the steps of equalization and channel estimation are done, which refers to the usage of received reference symbols in the data transmissions with respect to amplitude changes and phase shifts on the incoming transmissions.

Finally the data on the subcarriers are transformed in the time domain by means of the inverse FFT, and are serialized in the following. At the end a demodulation reverting the modulation from the beginning needs to be carried out in order to receive the originally transmitted payload. The demodulation needs to use the same modulation scheme, only reverted, as it was done at the modulation step in the UE.

Figure 2:
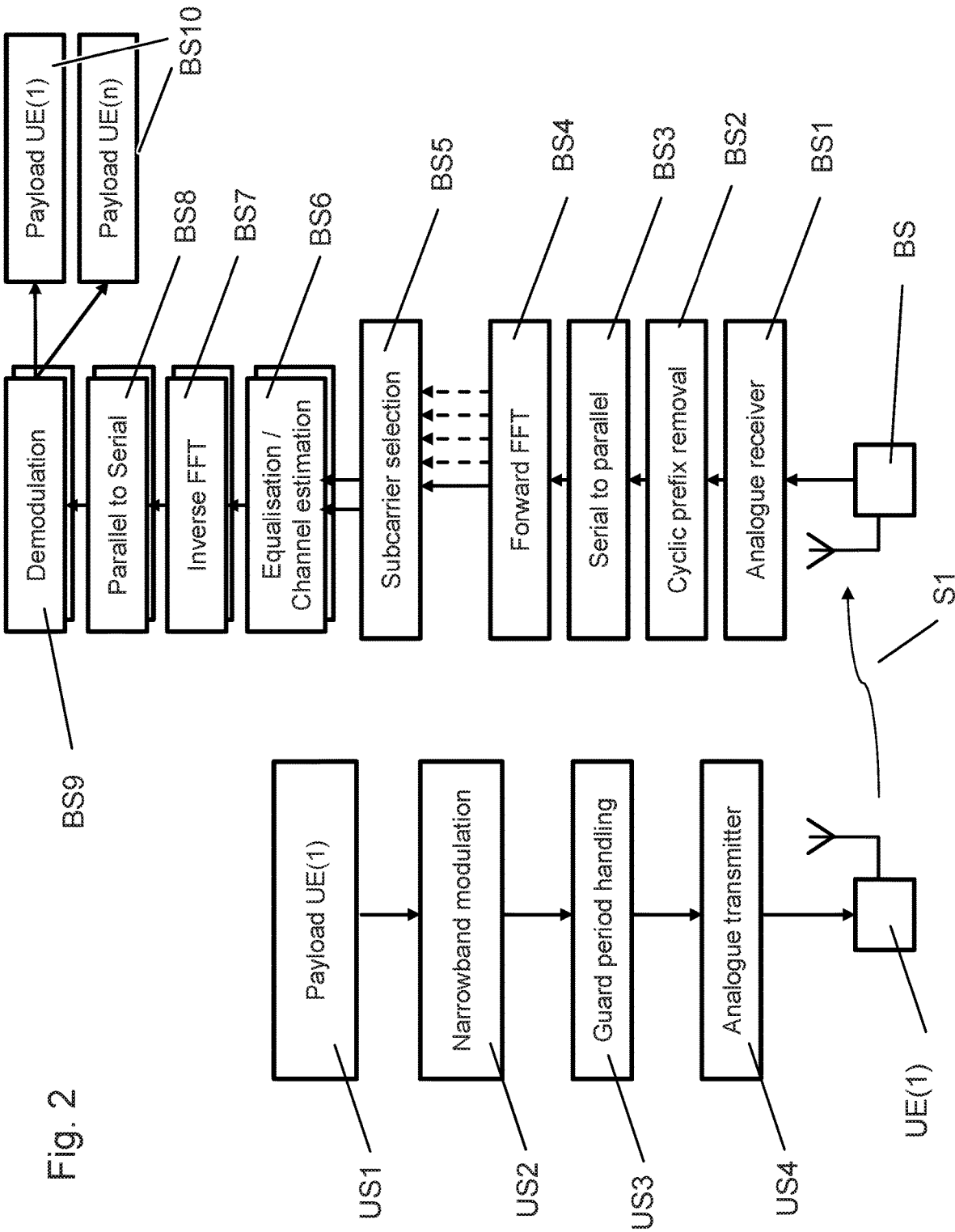
FIG. 2 represents a block diagram of operating steps from transmitting user equipment and receiving base node according to a preferred embodiment of the invention

In contrast FIG. 2 shows the same procedure for an exemplifying embodiment of the invention. As it can be seen the simplification is mainly affecting the UE, which was the goal of the invention.

It starts in step US1 on the UE side with the payload which is to be transmitted from the UE to the BS. Actually the transmission from one of a plurality of UEs is shown, here indicated as UE(1).

In the next step the modulation US2 is carried out which uses a single subcarrier narrowband modulation scheme, in particular GMSK or CW. These modulated data only needs to be shifted to the respective subcarrier frequency. The frequency refers to the subcarrier assigned from the BS for data transmission in an earlier step, in particular at registration, setup of data connection or a different start of a data service session.

As an adaptation to comply to the LTE protocol structure the handling is added in step US3 as well, that is guard periods are added in the modulated data stream, which is nothing more than inserting quiet phases within constant time periods.

Finally the resulting output is transmitted in step US4 via the analogue RF transmitter on the air interface S1.

As it can be seen neither serialisation/parallelisation steps nor forward or inverse FFTs are used for the data transmission according to the invention from the UE to the BS. If the analogue transmitter is only capable of supporting the narrowband modulation scheme, even the RF-transmitter has only the range sufficient to transmit one subcarrier.

On the BS side practically the same steps BS1 to BS10 are executed as according to the prior art. The subcarrier selection in BS5 leads to as many subcarriers as UEs transmitting data with the narrowband modulation scheme. Here is it indicated with two arrows, that two subcarrier, in particular the edge subcarriers of the respective frequency range, were reserved, at least timewise for such MTC-UEs using the narrowband modulation scheme, with results in separate payloads BS10 from the different UE(1), UE(n).

So for each of the transmitting UE(n) the next steps BS6 to BS10 are carried out. Only the demodulation step BS9 differs from the demodulation according to the prior art, as here the respective demodulation scheme needs to be chosen.

This processing queue on the BS side shows that no material changes are necessary on the base nodes supporting the inventive method. This is in particular true for the hardware parts, in particular the receiver, but also the general process is not materially changed which therefore only needs slight software modifications in order to support the inventive method.

Figure 3:
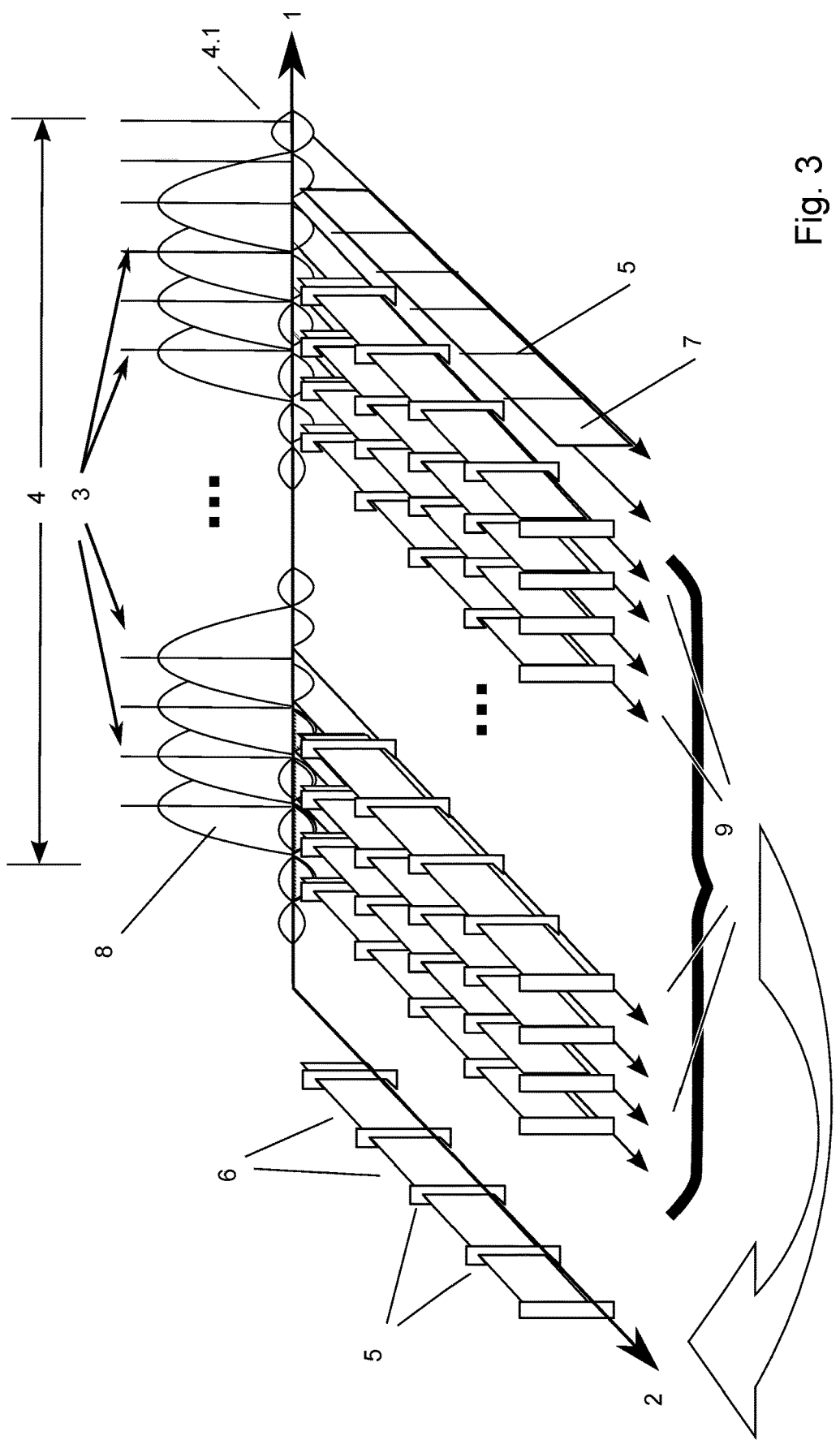
FIG. 3 shows the frequency time diagram in the uplink according to a preferred embodiment of the invention

FIG. 3 shows in a diagram over frequency and time the structure of the support frequency division multiple access method with the enhancement of an embodiment of the proposed invention. The diagram is over frequency 1 and time 2, and shows the signaling of the subcarriers 3 in a respective frequency bandwidth 4.

On the frequency axe 1 it is shown the amplitudes 8 of the signals transmitted on neighboring subcarriers 3. This shows the OFDMA typical distribution of the spacing of subcarriers by 15 kHz of the maximum of amplitudes 8, with an overlapping of the amplitudes, which nevertheless allows sufficient signaling quality without additional guard frequency. This design is one of the bases for achieving higher transmission rates with LTE rather than in previous technology standards.

Further each single OFDM symbol 6 is spaced by a cyclic guard period 5 which leads to a synchronization of the whole data transmissions. This structure is common to the subcarriers' time domain 9.

This concept generally affects the uplink and downlink transmission.

According to the preferred embodiment of the invention for a specific frequency 4.1, representing one specific subcarrier 3, instead of the SD-FDMA signaling another narrowband modulation scheme is embedded in the frequency bandwidth. In the specific embodiment this is shown as an edge subcarrier, which is advantageous as part of a specific embodiment of the invention. The transmission 7 on this subcarrier in the specific modulation scheme lasts along the time axis and also includes guard periods 5.

By means of taking advantage of the common amplitude structure of the subcarriers, interferences are omitted on the frequency of a specific subcarrier. With the narrowband structure of the modulation scheme no additional interferences are introduced, hence this modulation scheme can be embedded in the rest of the subcarrier's amplitude structure. This is due to the fact that an increase of capacity requirements for data transmissions is only requested in the time domain, not in the frequency domain. That means, that additional data transmissions simply take longer, which is supposed to be non-critical for the envisaged UEs. Additionally another subcarrier, preferably adjacent to the first subcarrier, is foreseen to be used by a UE, when more capacity is required and the resources are available both at the UE and the air interface.

Figure 4:
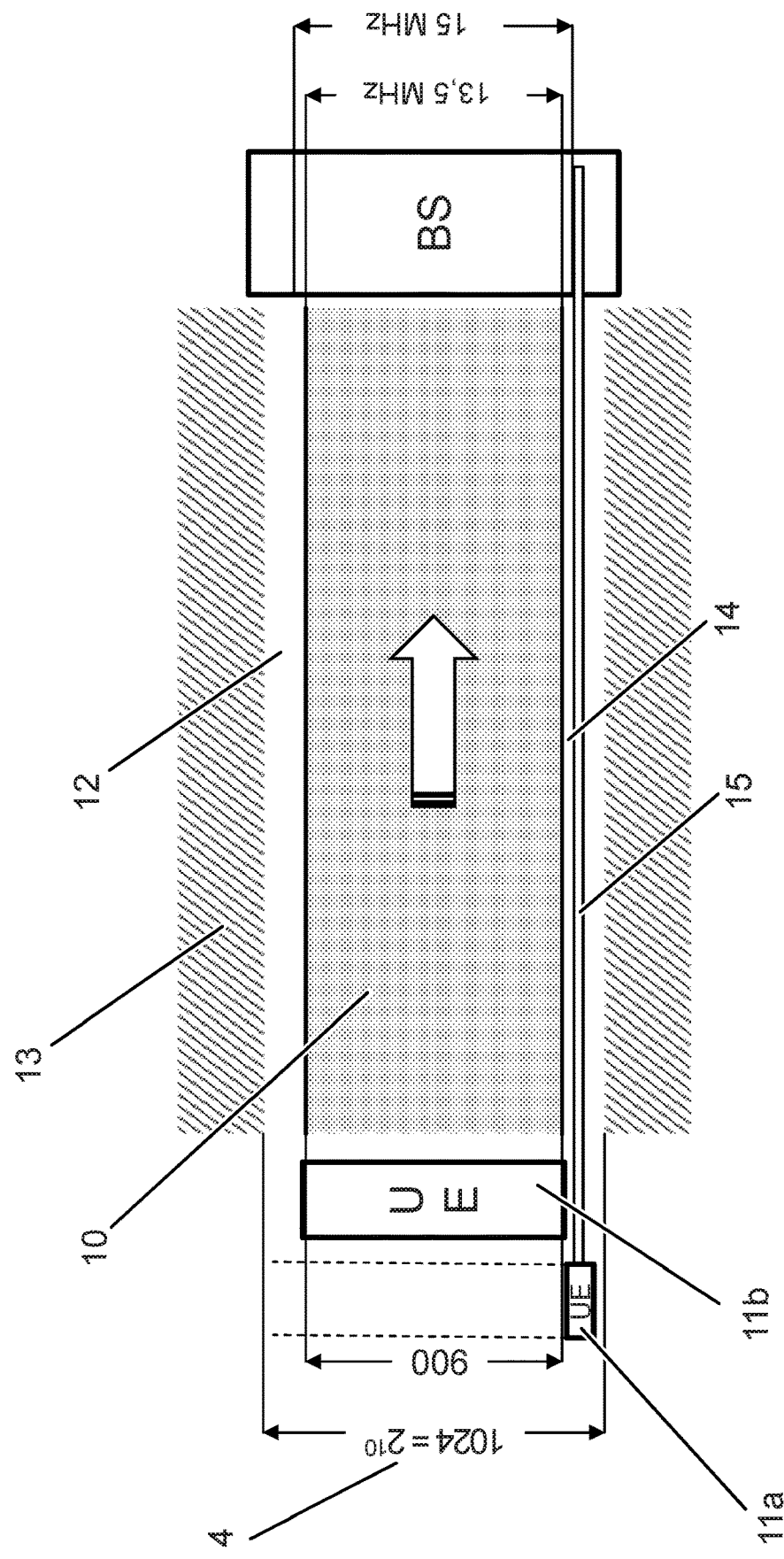
FIG. 4 shows used and unused frequency band and the use of guard bands as part of a preferred embodiment of the invention.

FIG. 4 shows as part of a further preferred embodiment of the invention the frequency band between a UE and a BS according to the LTE standard. It is exemplarily shown the frequency band of 15 MHz. For this frequency band it is according to the LTE standard foreseen an amount of 900 subcarriers, which covers a total of 13.5 MHz. On the edges of the frequency band a guard band 14 is added.

Further the FFT is executed best when a number of calculated data-points, in this case subcarriers, equals a power of 2. For the 900 MHz band this would equal to 1024 subcarriers. Hence, although only 900 subcarriers are declared, each BS is able to receive at least the 1024 subcarriers and carry out the FFT on the received subcarriers.

This leaves to a flank 12 additionally to the supported frequency range actually readable by the BS.

A common UE 11*b* operating according to the known LTE standard is using the area 10 for data submissions according to the assigned subcarrier resp. resource blocks distributed over the frequency of 13.5 MHz.

A low cost UE 11*a* which is capable to support the inventive method is in particular only configured to transmit data in a smaller range at a time. Over the full area of the frequency band, indicated by dashed lines, the UE is able to support a designated transmissions frequency, that it the subcarrier for data transmissions according to the first modulation scheme.

On the flank 12 of the readable frequency range the UE 11*a* hence is able to transmit data on a subcarrier 15 outside of the frequency area 10, preferably outside of the guard band 14.

This option is in particular advantageous as by this the frequency of other high performance wireless devices is not allocated. In particular as certain low cost UEs might due to the low transmission rate of the used narrowband modulation scheme take longer time for relatively low data amounts, the subcarriers allocated for low cost UEs would be blocked for a remarkable while. With dedicated subcarriers outside of the addressable frequency band of common LTE devices, here no resource collision in the air interface is happening. Further no hardware modifications on the BS side are necessary, as the used frequency band is still inside the frequency range which must be readable for the BS anyhow.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for data transmission from a wireless device to a base node, wherein (i) the base node is part of a cellular network and is configured to support frequency division multiple access method, (ii) a frequency bandwidth, receivable by the base node, comprises a plurality of subcarriers, and (iii) the wireless device is camping on the base node, the method comprising the steps of:
for the base node, assigning to the wireless device, a subcarrier of the plurality of subcarriers that is in a predetermined frequency range, and
transmitting data, from the wireless device, to the base node, (i) for a period of at least one data service session using only the assigned subcarrier, and (ii) using, for said data transmission, a first modulation scheme on the assigned subcarrier, wherein the first modulation scheme is a single subcarrier narrowband modulation scheme and is different from modulation schemes used, for groups of the subcarriers on said base node, by other wireless devices.

2. Method according to claim 1, wherein the first wireless device and the second wireless device are assigned to different device domains of the cellular network.

3. Method according to claim 1,
comprising the step for the base node of indicating to the wireless device the capability of supporting the indicated first modulation scheme, and subsequently receiving transmissions from the wireless device using the first modulation scheme.

4. Method according to claim 1,
comprising the step for the base node of indicating subcarriers reserved for the first modulation scheme out of the plurality of subcarriers to the wireless device.

5. Method according to claim 1, wherein the single subcarrier narrowband modulation scheme comprises one of:
continuous wave, and
Gaussian Minimum Shift Keying.

6. Method according to claim 1, wherein the assigned subcarrier is an edge subcarrier and is situated at one end of the frequency band supported by the base node.

7. Method according to claim 1, wherein
the assigned subcarrier is based on frequencies on the flank of the frequency band supported by the base node, and
said subcarrier is only usable for wireless devices supporting the first modulation scheme.

8. Method according to claim 1, wherein the plurality of subcarriers correspond to a physical resource block.

9. Wireless device configured to camp on a base node, said base node being part of a cellular network and being configured to (i) support frequency division multiple access method, and (ii) receive a frequency bandwidth comprising a plurality of subcarriers,
wherein the wireless device is configured to
receive, from the base node, a subcarrier from said plurality of subcarriers, said subcarrier being in a predetermined frequency range, and
transmit data, to the base node, (i) for a period of at least one data service session using only the assigned subcarrier, and (ii) using, for said data transmission, a first modulation scheme on the assigned subcarrier, wherein the first modulation scheme is a single subcarrier narrowband modulation scheme and is different from modulation schemes used, for groups of the subcarriers, by other wireless devices camping on said base node.

10. Wireless device according to claim 9, wherein the wireless device is assigned to a different device domain of the cellular network than the at least one second wireless device.

11. Wireless device according to claim 9, wherein the single subcarrier narrowband modulation scheme comprises one of:
continuous wave, and
Gaussian Minimum Shift Keying.

12. Base node being part of a cellular network, the base node being configured to (i) support frequency division multiple access method and (ii) receive a frequency bandwidth comprising a plurality of subcarriers from at least one wireless device camping on the base node, wherein the base node is further configured to:

assign, to a wireless device, a subcarrier of the plurality of subcarriers that is in a predetermined frequency range, receive data transmission, from said wireless device for a period of one data service session using only the assigned subcarrier, wherein the said data transmission is received in a first modulation scheme on the assigned subcarrier, said first modulation scheme being a single subcarrier narrowband modulation scheme and being different from modulation schemes used, for groups of the subcarriers, by other wireless devices camping on said base node.

13. Base node according to claim 12, wherein the base node is further configured to indicate to the wireless device the capability of supporting the indicated first modulation scheme, and subsequently to receive transmissions from the wireless device using the first modulation scheme.

14. Base node according to claim 12, wherein the base node is further configured to indicate subcarriers reserved for the first modulation scheme out of the plurality of subcarriers to the wireless device.

15. Base node according to claim 12, wherein the single subcarrier narrowband modulation scheme comprises one of:

continuous wave, and

Gaussian Minimum Shift Keying.

16. Base node according to claim 12, wherein the assigned subcarrier is an edge subcarrier and is situated at one end of the frequency band supported by the base node.

* * * * *